United States Patent [19]

Head

[11] 4,058,456

[45] Nov. 15, 1977

[54] EXTERNAL SUPPORTED FILTER

[75] Inventor: Brian Arthur Head, Maidstone, England

[73] Assignee: Whatman Reeve Angel Limited, Maidstonet, England

[21] Appl. No.: 761,027

[22] Filed: Jan. 21, 1977

[30] Foreign Application Priority Data

Dec. 24, 1976 United Kingdom ............... 54165/76

[51] Int. Cl.² ......................... B01D 37/00; C02B 3/00; C02C 3/00; B07B 9/00
[52] U.S. Cl. .................................... 210/23 R; 210/65; 55/97; 55/524; 427/244
[58] Field of Search ............... 210/505, 508, 509, 489, 210/490, 491, DIG. 5, 75, 23 R, 315, 103, 65; 55/524, 97; 427/244

[56] References Cited

U.S. PATENT DOCUMENTS

| 3,158,532 | 11/1964 | Pall et al. | 210/503 |
| 3,707,398 | 12/1972 | Charlesworth | 210/75 |
| 3,767,054 | 10/1973 | Farrow et al. | 210/232 |
| 3,800,945 | 4/1974 | Fowler | 210/505 |
| 3,891,417 | 6/1975 | Wade | 55/527 |
| 3,972,694 | 8/1976 | Head | 210/505 |
| 3,980,565 | 9/1976 | Fowler | 210/489 |

Primary Examiner—Frank A. Spear, Jr.
Assistant Examiner—David R. Sadowski
Attorney, Agent, or Firm—Richard P. Crowley

[57] ABSTRACT

A method of manufacturing an inside-to-outside flow filter tube and the filter tube so manufactured which comprises: providing a porous tube comprising a wet mat of randomly disposed glass fibers; positioning an external reinforcing sleeve material concentrically about the porous tube; applying an outward force to the porous tube to expand the external diameter of the porous tube into intimate contact with the sleeve material; and drying the tube and bonding the fibers of the tube into an integrally supported filter tube.

27 Claims, No Drawings

EXTERNAL SUPPORTED FILTER

This invention relates to externally reinforced filter tubes and to a method of manufacturing such filter tubes. The invention also relates to a method of filtering a fluid stream using such filter tubes.

Most disposable cartridge filters are usually operated with outside-to-inside flow direction of the liquids or gases to be filtered. The outside-to-inside flow permits a greater dirt-holding volume in the filter housing than if inside-to-outside flow were used. In addition, it is easier to support the filter tube to resist high differential pressures when the flow direction is outside-to-inside, because the smaller-diameter mechanical support (usually a perforated tube or porous rigid tube) can usually be fabricated from commercially available materials, while a larger-diameter support for the outside of the cartridge usually requires custom fabrication.

There is another reason that internal support is usually preferred over external support, which applies particularly to disposable cylindrical filter tubes; for example, with approximately ⅛-inch wall thickness, made from a nonwoven random network of glass fibres 0.1 to 10 microns in diameter and bonded at the junction of the fibres by a hardened material, such as a resin. Filter tubes of this general type are described, for example, in U.S. Pat. No. 3,767,054. Filter tubes of this type are commonly manufactured by forming onto the external surface of a cylinder, either by depositing fibres onto a porous cylinder wall by vacuum, or by rolling a sheet of fibres onto the wall of the cylinder. As a result, the inside diameter of the filter tube is almost exactly the same as the outside diameter of the forming cylinder, and, therefore, the inside diameter of the filter tubes can be made uniform and generally reproducible from tube to tube in production. For example, a control range of ± 0.005 inches on the tube internal diameter, or even less, is easily achieved. However, since the outside diameter of the filter tube is not confirmed during the forming process, control of this diameter is much more difficult, and the variability in outside diameter from tube to tube is much greater, typically ± 0.030 inches or more.

The variability in external diameter of filter tubes of this type has made the design and fabrication of external supports much more difficult and expensive than internal supports. For example, a reusable internal support of perforated metal or plastic (as shown in U.S. Pat. No. 3,767,054) is quite feasible, because the close control of internal diameter of the filter tube assures that each filter tube will fit the support perfectly. It will be appreciated that satisfactory performance of the support requires that the internal diameter of the filter tube be large enough to permit the tube to be fitted; e.g. slid, over the support easily, and yet the internal diameter of the filter tube must not be considerably larger than the support core or else the support core will not adequately prevent rupture of the filter tube.

A support core which is large enough to fit over filter tubes at the large end of the diameter range will be too loose to support filter tubes at the small end of the diameter range. Furthermore, disposable external support cores have been found difficult and expensive, because the support core must be strong enough to prevent the filter tube from bursting, yet malleable enough to conform closely to the variable outside diameter dimensions of the filter tube. To perform satisfactorily at high differential pressures, the filter tube must be in relatively intimate contact with the support core. The external support problem might be solved by forming or casting the filter tube inside a rigid perforated or porous support, such as a screen, but this manufacturing procedure is inherently more expensive and difficult than forming the filter tube on the outside of a cylinder or mandrel.

Despite the difficulties in providing adequate dirt-holding capacity or burst strength for the filter tubes, there are definite advantages to filtering fluids in the inside-to-outside direction under certain conditions and for certain purposes. For example, when coalescing and removing liquid droplets from air or other gases, the inside-out flow direction is essential to permit drainage of the coalesced liquid and minimise the chance of re-entrainment and carryover of coalesced liquid by the gas (see *Hydraulics and Pneumatics*, August 1974, "Coalescing Filters Produce Clean Air for Fluidic Systems").

Another example in which inside-out flow is desirable is in the coalescing and separating of two or more liquid phases. In this procedure, the filter collects and coalesces droplets of the dispersed liquid phase and produces two distinct liquid phases which may then be easily separated. However, the coalescing action takes place throughout the depth of the filter tube element, and the clean separation of the two liquid phases occurs on the downstream surface of the filter tube. If the flow direction is outside-to-inside, the acceleration of the liquid as it leaves the relatively small flow area inside the tube tends to mix the two liquid phases and redisperse the discontinuous phase. However if flow is inside-to-outside, the liquid leaves the filter surface at minimum velocity, and the two liquid phases can separate cleanly within the filter housing.

A further example in which inside-to-outside flow is desirable is when a two-stage treatment of the fluid is desirable; for example, contacting the liquid with a sorbent material, such as an adsorbent clay or diatomaceous earth, followed by filtration. If flow is inside-to-outside through the filter tube, the loose powder, granular, or fibrous material which is used for the sorbent pretreatment, either as a filter aid or precoat material, or both, may be conveniently preloaded into the inside of the filter tube, and if necessary, held in place with perforated end caps. The single disposable filter tube cartridge then conveniently serves both to pretreat and filter the fluid. If flow were outside-to-inside through the filter tube, it would be difficult or impossible to retain a precoat of powder, granular, or fibrous material on the outside of the filter tube, and therefore, a less convenient two- or multiple-step filter process would be required, such as is described in *Bulletin TI-62*, 1973, of Balston Inc. (hereby incorporated by reference).

The present invention relates to a filter tube designed for flow in the inside-to-outside direction and to the method of manufacturing and use of such filter tubes.

According to the present invention there is provided a filter tube which comprises a porous tube comprising a plurality of non-woven fibres having interstices therebetween and an external reinforcement around the porous tube, the porous tube and reinforcement being in intimate contact as a result of an outwardly directed force having been applied to the porous tube.

The invention also includes a non-internally reinforced filter tube which comprises a porous tube comprising a plurality of non-woven fibres having interstices there-between and an external reinforcement concentrically arranged around the porous tube, the porous tube and reinforcement being in intimate contact throughout the region of their concentricity and the reinforcement being porous in said region. Preferably, in this embodiment, the reinforcement is uniformly porous in said region of concentricity, e.g. a mesh or structure with a network of pores or holes.

By "non-internally reinforced filter tube" as used herein is meant a tube lacking reinforcement in the bore thereof.

The invention further provides a method of manufacturing a filter tube, which method comprises providing a porous tube comprising a plurality of non-woven fibres having interstices therebetween, positioning an external reinforcement having an internal diameter in excess of the external diameter of the porous tube in concentric arrangement with the porous tube, and applying an outwardly directed force to the porous tube such that the external diameter of the porous tube is caused to expand until the porous tube and reinforcement make intimate contact.

In one embodiment the first-defined filter tube includes an internal support within the porous tube.

The fibres of the porous tube are non-woven, randomly disposed fibres often deposited from an aqueous slurry of the fibres, formed into tube form, dried, and then impregnated with a suitable binding agent, and dried or cured to form a semirigid self-supporting filter tube. Examples of suitable fibres are alumina, zirconia and glass, particularly borosilicate glass fibres. The fibres may range in diameter and for the application described are usually less than 10 microns; e.g., 0.001 to 10 microns, such as 0.03 to 8 microns; e.g., 0.1 to 3.5 microns. The binding agents may vary, and include, but are not limited to, hardened resins such as thermosetting or curable resins like phenolformaldehyde and epoxy resins, as well as silicone resins, the oxides of the fibres used such as silica for glass fibres, and other materials used as binding agents like quaternary ammonium silicates and the like. Preferably, the porous filter tubes are composed of glass fibres with hardened resin binders; although inorganic binders are useful where the tube is employed in high-temperature use.

The porous filter tube wall thickness may vary as desired, but in typical filter tubes, the wall thickness would range from about 0.100 to 0.200 inches; e.g., 0.125 to 0.150 inches, with a fibre density of about 0.15 to 0.25 grams/cc.

Pretreatment materials may be used internally with the tubes, such as prefilter fibres, but such materials are usually of much lower density than the porous tube walls, such as 0.05 grams/cc or less for glass fibre prefilter materials.

Pretreatment materials useful internally with the filter tubes of the present invention encompass a wide variety of fibrous and particulate material (powder or granular) which may function for a variety of purposes, such as prefiltering as with glass fibres, as sorbing materials to remove impurities or other materials by adsorption or absorption, such as clay and diatomaceous earth materials, to remove colour bodies from a gas or a liquid-like oil, as sterilising agents like the use of metal salts, such as silver salts on support materials like silica gel to sterilize water and to filter out visible impurities, as reacting materials, such as catalysts on a support to cause or effect a desired reaction, such as in filter tubes with a reinforced inorganic binder containing an internal noble metal catalyst like platinum or an inert support-like silica, and wherein a high-temperature gas reaction is effected by simply passing hot gas from the inside to the outside of the filter tube, and as ion-exchange agents by employing one of more layers of a suitable ion-exchange resin in the interior of the tube as a pretreatment material to obtain a desired ion exchange. The pretreatment materials, when in fibrous form, may be packed within an internal perforated cylinder within the internal diameter of the tube, or wrapped, such as in kit form, in a helical coil within the internal diameter with or without an internal porous support. Typically, end caps or other means are used to retain the pretreatment materials in place, particularly where the material is in loose particulate form. The pretreatment material may, like an outside coalescing sleeve (see later), comprise an open-cell foam material inserted within the filter tube and adjacent and snugly fitting the internal wall surface of the filter tube.

Optionally, a coalescing sleeve material (a coalescing sock) is positioned about and adjacent the external reinforcement of the filter tube, with a typical material comprising an open-cell porous foam or fibrous material with a usual material comprising an open-cell porous polyurethane foam sleeve to serve as an oil-coalescing material; although other porous materials may be used.

Examples of suitable external reinforcements are moulded porous plastics material tubes (e.g. polypropylene), and porous metal tubes. Such materials are commercially available with relatively loose tolerances with respect to internal diameter. Alternatively, a scrim material could be used depending upon the desired burst strength, e.g. a continuous cylindrical scrim in the form of a net or mesh.

The porous tube utilised in the present invention may be a scrim-reinforced tube of the type described in U.S. patent application Ser. No. 679,569, filed Apr. 23, 1976.

As indicated above, the porous tubes used in the filter tubes of the present invention may be formed by the use of a fibre slurry. Thus, the fibre slurry may be formed from the basic fibrous solid and fibres deposited in a desired amount and thickness onto the external wall surface of a cylindrical porous mandrel, and scrim material (if present) wrapped about the deposited fibres, additional fibres from a fibre slurry then being deposited over the wrapped scrim material, the additional fibres being of the desired amount and thickness. If desired, a number of scrim wrappings may be used with additional fibres deposited between each wrapping to provide enhanced burst strength; however, care must be taken not to employ in a thin wall thickness too many scrim layers or scrim wrappings so as to affect the structural integrity of the filter tube, such as to affect segregation of the tube into separate layers which would be detrimental to filter tube strength and performance.

The porous filter tube may also be manufactured by depositing the fibre slurry onto a flat screen and subsequently rolling a mandrel thereon. In the mandrel coating technique, the scrim material is not desired on the internal surface, while scrim, as a part or all of the internal surface in the screen technique, is permissible.

The manufacturing method of the present invention may be effected by providing a layer of fibres on a vacuum mandrel, as above, if desired, compressing the fibres into a particular cylindrical form by rolling onto, e.g. a stainless steel wire cloth covered surface, sliding the external reinforcement over the fibre-coated mandrel (a tight fit not being desired or obtained since neither the external diameter of the filter tube nor the internal diameter of inexpensive external support cores can be reproduced accurately), releasing the vacuum from the mandrel and rolling the resulting covered mandrel on a surface (e.g. a wire covered surface) such that the porous tube expands away from the mandrel and makes intimate contact wih the internal surface of the external reinforcement. Rolling is preferably effected in such a manner as to obtain a substantially uniform degree of contact between porous tube and reinforcement throughout the region where they are concentric.

After rolling, the resulting integral filter tube may be removed from the mandrel, dried, and optionally impregnated with a binder (such as those mentioned before). Suitable binders are epoxy resins, silicone resins, colloidal silica and phenolic resins.

The filter tube may, of course, then be cut to a particular length and fitted with any desired further components such as end caps), internal prefilter materials, and/or external coalescing socks.

In practice, large increases in porous tube external diameters are not effected in the present method. Dimensions are selected so as to be convenient in overcoming the tolerance problems outlined above with respect to external reinforcements. It has, however, been found experimentally that a 2 inch internal diameter porous tube (glass fibre) may have its external diameter increased from 2.5 inches to 2.55 inches with no apparent damage. Further rolling in this particular instance did not increase external diameter. Typically, the external diameter of the porous tube can be made to ± 0.02 inches tolerance and external reinforcing meshes can be obtained with internal diameters to ± 0.03 inches tolerance. Thus, in practice, the maximum expansion of the porous tube into the external reinforcement would be 0.1 inches.

It should be appreciated that the outwardly directed force applied to the porous tube during the present method may, for example, be applied by the passage of a fluid under pressure through the tube. The invention is not limited to the rolling technique for applying such force as outlined above. Thus, for example, compressed air or water may be used to force expansion of the porous tube.

In connection with the measurement of the strength of filter tubes, two general strength measurement properties are employed. One property is related to the collapse strength of the tube which is that pressure (psi) at which, when evenly exerted onto the outside surface of the tube, causes the tube to collapse inwardly. This measurement is of particular importance where the tube is to be employed in outside-to-inside fluid flow direction. The collapse strength of a tube determines under particular use conditions whether or not a porous support core is required. Another property is related to the burst strength of the tube which is that pressure at which, when evenly exerted onto the inside surface of the tube, causes the tube to burst outwardly. This measurement is of particular importance where the tube is to be employed in inside-to-outside fluid flow direction. The burst strength of the tube determines the maximum differential pressure rating to be placed on the filter tube element, and determines whether or not an external support is required in use. Both properties are of importance under some conditions, such as where the filter tube is used as a vent filter with flow occurring in both directions. However, in coalescing-type filters, where inside-to-outside flow is used or necessary, then the burst, and not the collapse, strength of the tube is of significance.

The filter tubes described herein are made of much improved burst strength and have good contaminant-holding capacity and are particularly useful as filters for exhaust gases, such as for exhaust gases of internal combustion engines, such as crankcase diesel or gasoline-powered automobile engines, for compressed air filtration for air to instruments where an oil-free compressed air is desired, for use in filtering vacuum pump exhaust gases which often have a visible oil mist from the oil of the oil seal of the vacuum pump, and for separating a multiphase liquid, such as removing oil droplets in an aqueous stream, and for other applications where improved burst strength and/or good contaminant-holding capacity is necessary or desired.

The invention includes a method of filtering a fluid stream which method comprises introducing the fluid stream into the interior of a filter tube of the invention and passing the fluid stream from inside to outside the filter tube to filter contaminants therefrom.

The fluid stream may, for example, be a compressed air stream containing oil aerosol as a contaminant or an exhaust gas stream of an internal combustion engine containing oil aerosol as a contaminant.

Alternatively the fluid stream may be, for example, a liquid stream containing an immiscible, dispersed liquid phase as a contaminant.

It is preferred that after passage through the wall of the filter tube the stream is passed through an open porous material surrounding the outer wall surface of the filter tube to drain coalesced contaminants from the stream. In one preferred embodiment of this type the open porous material is an open-cell polyurethane foam and the stream is a compressed gas stream (e.g. compressed air) and the contaminant oil aerosol is in the compressed gas stream.

In another embodiment, the invention provides a method of filtering a fluid stream containing a contaminant material, which method comprises introducing the stream into the interior of a filter tube of the invention containing a prefilter material of particulate or fibrous material within the porous tube, passing the stream introduced into the interior of the filter tube through the prefilter material to remove at least a portion of the contaminants from the stream, and passing the stream after passage through the prefilter material through the surrounding peripheral wall of the filter tube to remove additional contaminants from the stream, thereby obtaining a filtered fluid stream.

In such a method, preferably the prefilter material has a density less than the density of the filter tube and is of a higher porosity. The fluid stream may be one of those previously mentioned.

In addition, in such a method the filter tube may contain an overlapping reinforcing scrim material (as referred to above) about and within the wall of the filter tube.

After passage through the wall of the filter tube the stream may be passed through an open porous material surrounding the outer wall surface of the filter tube to drain coalesced contaminants from the stream. In one particular embodiment the open porous coalescing material is an open-cell polyurethane foam and the stream is a compressed gas stream (e.g. compressed air) and the contaminant oil aerosol is in the compressed gas stream.

An externally reinforced filter tube in accordance with the invention can be fitted with an internal winding of a coarser filter material so as to form a filter cartridge with integral prefilter. It is much more convenient for the flow to be inside to outside since the prefilter can be wound around the internal diameter of the reinforced filter tube. A filter tube, for example, impregnated with epoxy resin binder can be fitted with a winding of coarse glass fibre paper. The filter can be used to filter contaminated water and one might expect the life of the filter tube to be extended by a factor of from about 5–10.

A filter tube in accordance with the invention can also be used to make a convenient composite filter cartridge containing a particulate or granular filling. The fillings can be adsorbents, such as activated carbon or molecular sieve or can be chemical pre-treatment materials such as ion exchange resins. Such composite filter cartridges can be used to filter both liquids and gases.

In yet a further specific use of the present invention an oil emulsion can be removed from water by passing it through a high efficiency filter tube. When the oil emerges from the downstream side of the filter element, it will float and separate from the system. It is of particular advantage, therefore, for the flow from the filter tube to be from the inside to the outside of the element since the oil can then be removed from the bowl of the filter housing. A 2 micron liquid filter tube impregnated with silicone resin and externally reinforced, has been found particularly efficient for this purpose. An oil emulsion containing about 500 p.p.m. of oil and 100 p.p.m. of a detergent has been passed through such a filter element and the concentration of oil downstream of the filter was found to be less than 10 p.p.m.

The invention will now be further illustrated and described by way of the following Examples:

EXAMPLE 1

Johns Manville Type 753 Borosilicate Glass Microfibre Code 108B was dispersed in water with the additon of a small quantity of hydrochloric acid, yielding a slurry of concentration 2.0–2.5 grams per litre in very dilute hydrochloric acid pH 3.0. This slurry was deposited by vacuum onto the external surface of a cylindrical porous mandrel of outside diameter 1.01 inches. Sufficient fibre was deposited such that after consolidation by rolling on a stainless steel wire covered board using a fairly high pressure, the external diameter of the fibre cylinder was 1.30 inches approximately. Whilst the vacuum was kept turned on, a porous plastics sleeve was slid over the outside diameter of the fibre cylinder. The porous plastics sleeve was an extruded polypropylene cylindrical mesh of approximately 33.5 mm internal diameter and 37.5 mm external diameter (Norddeutsche Seekabelwerke Code R2/16 MPE).

The fit between the internal diameter of the polypropylene sleeve and the external diameter of the glass microfibre filter cylinder was loose and did not need to be controlled within fine tolerances.

The vacuum to the mandrel was then turned off and the filter tube with the sleeve in position was rolled on a stainless steel wire cloth covered board using moderate hand pressure. The rolling back and forth across the board was continued until the external diameter of the glass fibre tube had been increased sufficiently for it to become intimately in contact with and partially imbedded in the plastics sleeve. The filter tube with integral external plastics support was then removed from the mandrel, stood on a rack and dried in a steam over at 90° C for 8 hours.

After drying, the externally reinforced filter tube was immersed in a 5% solids solution of an epoxy resin in Methyl Ethyl Ketone solvent. The filter was then removed, allowed to drain and stood in a warm air evaporation cupboard until all the solvent had been removed.

The externally reinforced filter tube was then cured by placing it in a steam oven at 140° C for approximately 4 hours.

After cooling, the externally reinforced filter tube was cut to the required length and a coalescing anti-reentrainment foam sleeve was fitted to the external surface of the filter.

EXAMPLE 2

Filter tubes of the present invention have superior burst strengths when compared to standard filter tubes and the filter tubes of copending Application U.S. Ser. No. 679,569, filed Apr. 23, 1976. Thus, filter elements of identical dimensions were manufactured from the same glass fibre material and the same epoxy resin binder by three techniques.

The first technique was the standard tube making technique whereby fibre from the aqueous dispersion of Johns Manville Code 108B glass microfibre at pH 3.0 was deposited onto a mandrel of 1 inch external diameter and rolled to produce a filter tube of approximately ⅛ inch wall thickness. The filter tube was subsequently dried and impregnated in a 5% w/w solution of epoxy resin in Methyl Ethyl Ketone solution. The solvent was then removed by evaporation and the filter tube cured at 140° C for 2 hours. The second technique used the same dispersion of glass fibre and the same impregnating solution of epoxy resin. The filter tube produced was to the same dimensions, but incorporated an internal reinforcing scrim in accordance with the above-mentioned copending application. This scrim was Fothergill & Harvey Code CMO 92/VO1/VO, a glass fibre scrim of approximately 1 cm square mesh size. Three turns of the scrim were used. The third technique used was the external reinforcing technique of the present invention using a polypropylene external support core. The mesh is approximately 1/16 inch wall thickness with perforation size approximately 1.3 × 2.0 mm. Again, all other raw materials and process details were the same.

The results were as follows:

|  | Standard Tube | Tube of U.S. 679,569 | Present Invention Tube |
|---|---|---|---|
| Air flow resistance at 15 cm/sec. (mmHg) | 24 | 24 | 25 |
| Burst Strength p.s.i. | 30 | 62 | *>100 psi |

It appears that the burst strength of tubes made by the present invention will be the same as the burst strength of the external support materials. Since external support materials can be made with very high burst strengths indeed, e.g. welded metal mesh (1/16 inch thickness), it follows that tubes of this invention can be manufactured with similarly high burst strengths.

What we claim is:

1. A method of manufacturing an inside-to-outside flow filter tube of improved burst strength, which method comprises:

a. forming a wet mat of a desired and generally uniform-depth, randomly disposed, nonwoven, inorganic fibers having interstices therebetween, and having a diameter of from about 0.001 to 10 microns, onto the external surface of a cylindrical, porous, vacuum mandrel to form a porous filter tube;

b. positioning an external, reinforcement, porous, sleeve material, having a selected internal diameter slightly in excess of the external diameter of the wet mat of fibers of the filter tube, about the filter tube and into a concentric arrangement with the filter tube;

c. applying an outwardly directed force to the fibers of the filter tube such that the external diameter of the filter tube expands into intimate contact with the concentric sleeve material;

d. drying the filter tube so formed; and e. bonding the filter tube and external sleeve material with a bonding agent into an integral filter tube.

2. The method of claim 1 wherein the wet mat of fibers is formed by depositing the fibers onto the external wall surfaces of a cylindrical porous mandrel from a slurry of the fibers, into which slurry the mandrel is inserted, by applying a vacuum to the mandrel.

3. The method of claim 1 wherein the wet mat of fibers is formed by depositing the fibers from a slurry of the fibers onto a flat screen, and subsequently rolling up the wet mat of fibers formed onto the surface of a cylindrical, porous, vacuum mandrel.

4. The method of claim 1 wherein the inorganic fibers are glass fibers, alumina fibers or zirconia fibers.

5. The method of claim 1 wherein the inorganic fibers are borosilicate glass fibers having a diameter of from about 0.03 to 8 microns.

6. The method of claim 1 which includes, after forming and prior to positioning, the step of compressing the fibers of the formed filter tube.

7. The method of claim 6 wherein the fibers are compressed into a cylindrical form by rolling the fibercovered mandrel on a surface.

8. The method of claim 7 wherein the surface is provided by a stainless-steel wire cloth on a support.

9. The method of claim 6 wherein the external reinforcement is slid over the fiber-covered mandrel after the fibers have been compressed into a cylindrical form and the resulting covered mandrel is rolled on a surface, such that the porous tube expands away from the mandrel and makes intimate contact with the internal surface of the external reinforcement.

10. The method of claim 6 wherein the external reinforcement is slid over the fiber-covered mandrel after the fibers have been compressed into a cylindrical form, the mandrel removed and a fluid under pressure passed through the porous tube, such that the porous tube expands away from the mandrel and makes intimate contact with the internal surface of the external reinforcement.

11. The method of claim 1 wherein the sleeve material is a porous plastic material tube or a porous metal tube.

12. The method of claim 1 wherein the sleeve material is a porous, molded, polypropylene tube.

13. The method of claim 1 wherein the bonding agent comprises hardened resin, alumina, zirconia, silica or a quaternary ammonium silicate.

14. The method of claim 1 wherein the wall thickness of the integral, dried and bonded filter tube is from 0.1 to 0.2 inches, and wherein the fiber density is from 0.15 to 0.25 grams/cc.

15. The method of claim 1 wherein the outwardly directed force is applied by rolling the filter tube on the mandrel and after releasing the vacuum on a wire-covered surface.

16. The method of claim 15 which includes the steps of:

a. compressing the external diameter of the filter tube, prior to positioning the sleeve material while the vacuum in the mandrel is maintained, by rolling the filter tube onto a wirecovered surface; and, after positioning the sleeve material, b. releasing the vacuum in the mandrel and rolling the filter tube with the sleeve under pressure on a wire-covered surface to expand the fibers of the filter tube into intimate contact with the concentric sleeve material.

17. The method of claim 1 wherein the tolerance of the external diameter of the filter tube and the tolerance of the sleeve material are selected to provide a maximum expansion of the filter tube into the sleeve material of 0.1 inches.

18. The method of claim 1 wherein, during the forming and positioning steps, a vacuum is maintained in the cylindrical vacuum mandrel.

19. The method of claim 1 which includes placing a porous, coalescing, sleeve material about the external diameter of the dried, bonded filter tube.

20. The method of claim 1 which includes placing a layer of a pretreatment material about the internal surface of the dried, bonded filter tube.

21. The filter tube produced by the process of claim 1.

22. A method of manufacturing an inside-to-outside flow filter tube of improved burst strength, which method comprises:

a. forming a wet mat of a desired and generally uniform-depth, randomly disposed, nonwoven, inorganic glass fibers having interstices therebetween, and having a diameter of from about 0.001 to 10 microns, onto the external surface of a cylindrical, porous, vacuum mandrel to form a porous filter tube;

b. compressing the filter tube by rolling the filter tube on the mandrel under pressure on a surface, with a vacuum maintained in the vacuum mandrel during the forming and compressing steps;

c. positioning an external, reinforcement, porous, sleeve material, having a selected internal diameter slightly in excess of the external diameter of the wet mat of glass fibers of the filter tube, about the filter tube and into a concentric arrangement with the filter tube; and d. applying an outwardly directed force to the glass fibers of the filter tube, such that the external diameter of the filter tube expands into intimate contact with the concentric sleeve material, by application of fluid pressure to the interior of the filter tube, or rolling the filter tube upon a surface.

23. The filter tube produced by the process of claim 22.

24. A method of filtering a fluid stream, which method comprises introducing the fluid stream into the interior of a filter tube as claimed in claim 23, and passing the fluid stream from inside to outside the filter tube to filter contaminant therefrom.

25. The method of claim 24 wherein the fluid stream is a compressed air stream containing oil aerosol as a contaminant, or an exhaust gas stream of an internal combustion engine containing oil aerosol as a contaminant.

26. The method of claim 24 wherein the fluid stream is a liquid stream containing an immiscible, dispersed, liquid phase as a contaminant.

27. The method of claim 24 wherein the fluid stream has a pressure in excess of 100 psi.

* * * * *